United States Patent [19]

Kawai et al.

[11] Patent Number: 4,734,450
[45] Date of Patent: Mar. 29, 1988

[54] POLYPROPYLENE-BASE RESIN COMPOSITION CONTAINING AN INORGANIC FILLER AND 0.01 TO 0.6 WT. % OF CARBON BLACK

[75] Inventors: Yoichi Kawai, Yokohama; Masami Maki, Kawasaki; Masaru Abe, Yokohama; Sachio Yokote, Yokohama; Katsumi Sekiguchi, Yokohama, all of Japan

[73] Assignee: Mitsui Toatsu Chemicals, Incorporated, Tokyo, Japan

[21] Appl. No.: 841,265

[22] Filed: Mar. 19, 1986

[30] Foreign Application Priority Data

Mar. 22, 1985 [JP] Japan ................. 60-55944
Mar. 26, 1985 [JP] Japan ................. 60-59585
Mar. 26, 1985 [JP] Japan ................. 60-59586
Apr. 3, 1985 [JP] Japan ................. 60-69049

[51] Int. Cl.$^4$ .................... C08K 3/04; C08K 3/00; C08K 3/18
[52] U.S. Cl. .................... 524/413; 523/220; 524/418; 524/423; 524/424; 524/426; 524/427; 524/432; 524/433; 524/436; 524/437; 524/445; 524/449; 524/451; 524/456; 524/504
[58] Field of Search ............ 524/496, 504, 451, 413, 524/418, 423, 424, 426, 427, 432, 433, 436, 437, 445, 449, 456

[56] References Cited

U.S. PATENT DOCUMENTS

| 2,951,821 | 9/1960 | Kesling | 524/496 |
| 3,206,419 | 9/1965 | Pritchard et al. | 524/496 |
| 3,422,056 | 1/1969 | Carton | 524/496 |
| 3,775,365 | 11/1973 | Mathis et al. | 524/496 |
| 4,421,678 | 12/1983 | Mehta | 524/496 |
| 4,433,073 | 2/1984 | Sand et al. | 524/525 |
| 4,480,065 | 10/1984 | Kawai et al. | 524/424 |
| 4,504,617 | 3/1985 | Yui et al. | 524/525 |
| 4,552,689 | 11/1985 | Yui et al. | 524/496 |
| 4,621,115 | 11/1986 | Morita et al. | 524/504 |

FOREIGN PATENT DOCUMENTS

| 1810344 | 3/1970 | Fed. Rep. of Germany | 524/496 |
| 0031103 | 3/1980 | Japan | 524/496 |
| 0197763 | 10/1985 | Japan | 524/496 |

OTHER PUBLICATIONS

Mod. Plas., 39, No. 9, (1962), pp. 153 to 160 and 230.
J. Appl. Poly. Sci., 11, (1967), pp. 1461 to 1474.

*Primary Examiner*—Herbert J. Lilling
*Attorney, Agent, or Firm*—Fisher, Christen & Sabol

[57] ABSTRACT

A polypropylene-base resin composition comprising a polypropylene-base resin and carbon black in an amount of 0.01–0.6 wt. % based on the polypropylene-base resin and being suitable for use in the production of molded articles having excellent paintability.

15 Claims, No Drawings

POLYPROPYLENE-BASE RESIN COMPOSITION CONTAINING AN INORGANIC FILLER AND 0.01 TO 0.6 WT. % OF CARBON BLACK

BACKGROUND OF THE INVENTION

1. Field of the Invention

This invention relates to a polypropylene-base resin composition, and more specifically to a polypropylene-base resin composition suitable for use in the production of molded articles having excellent paintability. This invention also relates to a molded polypropylene-base resin article, especially, a car bumper, which has excellent paintability.

2. Description of the Prior Art

Polypropylene-base resins are excellent in weight reduction, durability, safety, moldability, economy and the like and their molded articles are hence widely used as various industrial elements, parts, components and so on typified by car parts and components such as bumpers. Many of such molded articles are colored in black or similar dark colors in view of their color tones, weatherability, etc. Reflecting recent needs on the market, there is an ever-increasing demand for painting such molded articles to impart high-quality appearance thereto from the aesthetic consideration. Accordingly, it is now indispensable to impart paintability to them.

These days, molded polypropylene-base resin articles are in many instances painted by treating their surfaces with a halogen-containing organic solvent such as trichloroethylene or trichloroethane, followed by their primer coating and topcoating [Mod. Plas., 39 (No. 9) 153 (1962)]. With a view toward solving the problem of environmental pollution due to such halogen-containing organic solvents and reducing the manufacturing cost by simplifying their painting process, it has been started using a new process in which subsequent to plasma surface treatments of molded article, their topcoating are carried out [J. Appl. Poly. Sci., 11 1461 (1967) and U.S. Pat. No. 4,465,715].

Most polypropylene-base resins have already been colored with inorganic or organic colorants or mixtures thereof prior to their painting, no matter whether they are painted at their entire surfaces or at their limited surface areas. It is a common practice to incorporate carbon black or a black or blackish pigment consisting primarily of carbon black, particularly, in elements, parts, components and the like which are used outdoors, in view of the manner of their use and with a view to making improvements to their weatherability. Under the circumstances, carbon black is incorporated in large proportions in polypropylene-base resins.

It has however been found that the paintability of a molded article of a polypropylene-base resin added with a large amount of carbon black is considerably reduced when a paint is applied thereto subsequent to its plasma treatment.

SUMMARY OF THE INVENTION

An object of this invention is to provide a polypropylene-base resin composition suitable for use in the production of molded articles capable of exhibiting excellent paintability subsequent to their plasma surface treatments.

Another object of this invention is to provide a polypropylene-base resin composition suitable for use in the production of bumpers which have high stiffness and high impact resistance and can show excellent paintability subsequent to their plasma surface treatments.

The following polypropylene-base resin composition has been provided by the present invention:

A polypropylene-base resin composition suitable for use in the production of molded articles having excellent paintability, comprising a polypropylene-base resin and carbon black in an amount of 0.01–0.6 wt. % based on the polypropylene-base resin.

DETAILED DESCRIPTION OF THE INVENTION

The polypropylene-base resin useful in the practice of this invention may preferably be a resin which comprises 100 parts by weight of a propylene-base resin (A), 0–100 parts by weight of a thermoplastic elastomer (B) and 0–100 parts by weight of an inorganic filler (C) with a proviso that $\{(B)+(C)\}/(A)$ is 1.0 or smaller.

The term "propylene-base resin" as used herein means a propylene homopolymer, an ethylene-propylene copolymer or a copolymer of propylene and one or more other α-olefins. As other illustrative examples of the propylene-base resin, may also be mentioned those obtained by adding various polyethylene resins and other crystalline resins thereto. If necessary, they may be modified either partially or entirely with an unsaturated carboxylic acid derivative such as maleic anhydride or the like prior to their use in the present invention.

Illustrative examples of the thermoplastic elastomer may include ethylene-propylene rubbers, ethylene-propylene-diene rubbers, styrene-butadiene rubbers, isobutylene-isoprene rubbers, etc.

The inorganic filler is either powdery or fibrous. As its illustrative examples, may be mentioned calcium oxide, magnesium oxide, calcium hydroxide, magnesium hydroxide, aluminum hydroxide, magnesium carbonate, calcium silicate, magnesium silicate, calcium sulfate, magnesium sulfate, calcium carbonate, barium sulfate, calcium sulfite, potassium titanate, talc, clay, mica, glass powder, basic magnesium carbonate, dolomite, wollastonite and so on. Among them, calcium carbonate, barium sulfate and talc are particularly preferred. These various kinds of inorganic fillers may be employed subsequent to their surface treatments with various kinds of coupling agents, surfactants or the like. These surface treatments contribute to the improvements of the stiffness and impact resistance of the resulting resin composition. The average particle size of the inorganic filler may be 6 $\mu$m or smaller, or preferably 5 $\mu$m or smaller, and particles having particle sizes of 10 $\mu$m or greater amount to 5 wt. % or less. If the average particle size of the inorganic filler exceeds 6 $\mu$m, the resulting polypropylene-base resin composition is reduced in impact resistance.

The term "average particle size" as used herein means a Nussenstein's particle size as measured in accordance with the light transmission method and is a value determined as the particle size at 50% in the corresponding cumulative particle size distribution (which is generally called "$D_{50}$").

As exemplary carbon black materials useful in the practice of this invention, may be mentioned furnace black, thermal black, channel black, acetylene black and the like which are all routinely employed to color polypropylene-base resins in black. In view of color tone, heat resistance, weatherability and the like, those having an average particle size of 5–40 m$\mu$ and a specific surface area of 50–1100 m²/g are employed preferably. Among the above-exemplified carbon black materials, furnace black and channel black are preferred. Needless to say, two or more of these carbon black materials may be employed in combination.

It is preferable to use carbon black the average particle size of which falls within the above-specified range. If the average particle size is too small, the particles undergoes secondary coagulation and their dispersibility is hence lowered. Besides, such very fine carbon black is more costly. If the average particle size becomes excessively large, the color tone is rendered poorer and the weatherability is reduced. It is hence not preferred to use carbon black having an average particle size outside the above-described range. As the value of the average particle size of carbon black, there is used a value measured directly by an electron microscope or that calculated on the basis of a specific surface area, which is in turn determined depending on the amount of adsorbed nitrogen, iodine or the like, while supposing that the particles are spherical.

If the sum of the thermoplastic elastomer and inorganic filler, which are incorporated in the propylene-base resin to make up the above-described polypropylene-base resin, exceeds 100 parts by weight per 100 parts of the propylene-base resin, the balance of mechanical and physical properties such as stiffness and impact resistance and paintability of the resulting polypropylene-base resin composition are reduced. It is therefore not preferred to incorporate the thermoplastic elastomer and inorganic filler beyond the above-mentioned limit.

The above-mentioned carbon black is added in an amount of 0.01–0.6 parts by weight or preferably 0.05–0.5 parts by weight, both, per 100 parts by weight of the polypropylene-base resin. Any amounts smaller than 0.01 parts by weight lead to reduced weatherability. Although a conventional heat-resistance/weatherability stabilizer may be employed to improve the weatherability, such a stabilizer must be used in a considerably high proportion. Thus, the price of the resultant resin composition becomes very high. Moreover, the stabilizer comes up to the surface of a molded article subsequent to its molding, leading to such drawbacks that its paintability and external appearance are reduced. It is hence impractical to rely upon such a stabilizer. On the other hand, addition of the carbon black in any amount greater than 0.6 parts by weight is not preferred because the peeling strength of a paint film applied subsequent to a plasma treatment is reduced to a significant extent and blister is rendered more susceptible to occur in a warm water resistance test.

One or more of antioxidants, thermal stabilizers, ultraviolet absorbents, flame retardants, nucleating agents, organic or inorganic pigments and/or the like, all of which are usually added to polyolefins, may also be added to the polypropylene-base resin, so long as their contents are limited to such levels that advantageous effects of the present invention are not impaired substantially.

As a particularly preferable polypropylene-base resin in this invention, may be mentioned a resin which comprises:
(a) 100 parts by weight of a crystalline ethylene-propylene block copolymer;
(b) 7–60 parts by weight of a thermoplastic elastomer; and
(c) 3–30 parts by weight of an inorganic filler.

A composition composed of the above resin and carbon black is preferred especially for car bumpers. Needless to say, the above-exemplified elastomers and fillers may be used as the elastomer b) and filler c).

The crystalline ethylene-propylene block copolymer (a) may preferably contain 7–30 wt. % of ethylene and 65 wt. % or more of matter insoluble in boiling n-heptane in view of the impact resistance and modulus of elasticity in flexure of a molded article to be obtained. As the thermoplastic elastomer (b), it is particularly preferred to use an ethylene-propylene rubber and/or an ethylene-propylene-diene rubber, each of which has a propylene content of 20–90 wt. % and a Mooney viscosity of 15–100 at 100° C.

If the content of the thermoplastic elastomer is less than 7 parts by weight in the above polypropylene-base resin, a molded article, especially, a bumper or the like from a resin composition obtained by mixing carbon black with the polypropylene-base resin is reduced in low-temperature impact resistance when it is painted subsequent to its plasma treatment. On the other hand, any amount greater than 60 parts by weight renders the surface layer of a molded article, especially, a bumper or the like more susceptible to peeling, thereby reducing the peeling structure of its paint film and moreover, resulting in a reduction to the stiffness of the molded article. It is thus not preferable to incorporate the thermoplastic elastomer in any amounts outside the above-specified range.

If the inorganic filler is incorporated in any amount smaller than 3 parts by weight, an article molded from the resin composition is reduced in stiffness and has poor utility, especially, as a bumper. If the content of the inorganic filler exceeds 30 parts by weight, the warm water resistance and moisture resistance of an applied paint film are reduced and blister is susceptible to occur between the resin layer and paint film and in addition, the lowtemperature impact resistance of the molded article is also reduced, all, due to the water contained in the inorganic filler. It is hence not preferred to incorporate the inorganic filler in any amounts outside the above-specified range.

In the present invention, the resin composition containing the polypropylene-base resin and carbon black is mixed, for example, by using a Henschel mixer or the like which is commonly employed in the present field of art. The resultant mixture is then kneaded by a single-screw extruder, a twin-screw extruder, rolls, a Banbury mixer or the like, followed by its pelletization.

The thus-obtained resin composition may then be formed into a desired molded article by a usual molding process such as injection molding, extrusion molding or compression molding.

The resultant molded article is subjected to a surface treatment with plasma prior to its painting. This plasma surface treatment is conducted by bringing plasma, which has been obtained by exciting oxygen, nitrogen or another inert gas, or a mixed gas thereof with a high-frequency wave discharge, microwave discharge or the like, into contact with the surface of the molded article. Although subject to the type of a gas to be employed, the following treatment conditions may generally be employed—pressure: 0.1–5 Torr; and treatment time: about 5–600 seconds. It may of course be necessary to increase the treatment time or to change the shape of the treatment tank in accordance with the shape of each molded article.

Certain Examples and Comparative Examples will hereinafter be given to describe the present invention and its effects specifically.

EXAMPLES 1-4

To 100 parts by weight of an ethylene-propylene copolymer (PP-A) having an ethylene content of 8% by weight, were added 0.05 part by weight of 2,6-di-tert-butyl-4-methylphenol, 0.1 part by weight of calcium stearate, 0.2 part by weight of tetrakis[methylene-3-(3',5'-di-tert-butyl-4'-hydroxyphenyl)propionate]methane, 0.4 part by weight of bis(2,2,6,6-tetramethyl-4-piperidyl)sebacate and 0.2 part by weight of 2-(3-tert-butyl-5-methyl-2-hydroxyphenyl)-5-chlorobenzotriazole as well as furnace black having an average particle size of 18 mμ and a specific surface area of 200 m²/g (hereinafter called "Carbon Black A") or channel black having an average particle size of 14 mμ and a specific surface area of 280 m²/g (hereinafter called "Carbon Black B") in an amount shown in Table 1. After mixing the thus-proportioned mixtures separately in a Henschel mixer, they were separately pelletized by an extruder having a barrel diameter of 40 mm and maintained at 230° C. to obtain resin compositions of this invention in their pelletized forms. The thus-obtained resin compositions were separately molded by injection molding, thereby obtaining test pieces (80×160×2 mm plates) for their painting tests.

After subjecting each of these test pieces to a plasma treatment under the below-described conditions, a two-pack topcoating urethane paint was applied to a thickness of ca. 100 μm. The thus-painted test pieces were dried at 90° C. for 40 minutes and then allowed to stand at room temperature for 48 hours, thereby obtaining painted test pieces.

Cuts were then formed at a distance of 1.0 cm by a cutter in the paint film of each of the painted test pieces. The 180° peeling strength of each paint film was measured by means of an Instron tensile testing machine. Furthermore, these painted test pieces were dipped in warm water of 40° C. and the quality of paint films were visually observed 240 hours later to evaluate their paintability. Results are summarized in Table 1.

Conditions for Plasma Treatment (1) Apparatus: Microwave plasma treatment apparatus (Model: TMZ-2026M; manufactured by Toshiba Corporation).
(2) Atmosphere: Oxygen.
(3) Time: 30 seconds.
(4) Gas pressure: 1.0 Torr.
(5) Gas flow rate: 480 cc/min.
(6) Microwave output power: 1500 W.

Evaluation Standard of Paint Film Quality

O: No visible blister in paint film.
Δ: Some blister in paint film.
X: Considerable blister in paint film.

EXAMPLE 5

A test was conducted in the same manner as in Example 1 except for the use of a polypropylene-base resin obtained by adding 20 parts by weight of an ethylene-propylene rubber (EPR-A), which had a propylene content of 26 wt. % and a Mooney viscosity of 24 at 100° C., to 80 parts by weight of the PP-A employed in Example 1. Results are shown in Table 1.

EXAMPLES 6-8

Tests were conducted in the same manner as in Example 1 except that the carbon black materials were changed to furnace black having an average particle size of 6 mμ specific surface area of 1000 m²/g (hereinafter called "Carbon Black C") and channel black having an average particle size of 35 mμ and a specific surface area of 60 m²/g (hereinafter called "Carbon Black D" and they were incorporated in amounts shown in Table 1. Results are shown in Table 1.

COMPARATIVE EXAMPLES 1-2

Tests were conducted in the same manner as in Examples 1 and 5 except that Carbon Black A was added in an amount of 1.0 parts by weight. Results are shown in Table 1.

TABLE 1

|  | Example |  |  |  |  |  |  |  | Comp. Ex. |  |
|---|---|---|---|---|---|---|---|---|---|---|
|  | 1 | 2 | 3 | 4 | 5 | 6 | 7 | 8 | 1 | 2 |
| Composition* | | | | | | | | | | |
| PP-A (wt. parts) | 100 | 100 | 100 | 100 | 80 | 100 | 100 | 100 | 100 | 80 |
| EPR-A (wt. parts) | — | — | — | — | 20 | — | — | — | — | 20 |
| Carbon Black A (wt. parts) | 0.3 | 0.5 | — | 0.2 | 0.3 | — | — | — | 1.0 | 1.0 |
| Carbon Black B (wt. parts) | — | — | 0.3 | 0.1 | — | — | — | — | — | — |
| Carbon Black C (wt. parts) | — | — | — | — | — | 0.05 | 0.3 | — | — | — |
| Carbon Black D (wt. parts) | — | — | — | — | — | — | — | 0.5 | — | — |
| Paintability | | | | | | | | | | |
| Peeling strength of paint film (kg/cm) | 1.1 | 0.9 | 1.0 | 1.1 | 1.2 | 1.1 | 1.1 | 0.9 | 0.2 | 0.3 |
| Warm water resistance | | | | | | | | | X | X-Δ |

*Other additives:
2,6-Di-tert-butyl-4-methlphenol - 0.05 part by weight.
Calcium stearate - 0.1 part by weight.
Tetrakis[methylene-3-(3',5'-di-tert-butyl-4'-hydroxyphenyl)propionate]methane - 0.2 part by weight.
Bis(2,2,6,6-tetramethyl-4-piperidyl)sebacate - 0.4 part by weight.
2-(3-Tert-butyl-5-methyl-2-hydroxyphenyl)-5-chlorobenzotriazole - 0.2 part by weight.

EXAMPLES 9-13

An ethylene-propylene block copolymer (PP-B) having an ethylene content of 6.8% and a melt flow index of 8.0 g/10 min and talc having an average particle size of 1.3 μm were employed as a polypropylene-base resin and an inorganic filler, respectively. To 100 parts by weight of a filler-containing polypropylene-base resin consisting of the PP-B and talc in amounts given in Table 2, were added 0.05 part by weight of 2,6-di-tert-butyl-4-methylphenol, 0.1 part by weight of calcium stearate, 0.2 part by weight of tetrakis-[methylene-3-(3',5'-di-tert-butyl-4'-hydroxyphenyl)propionate]methane, 0.4 part by weight of bis(2,2,6,6-tetramethyl-4- piperidyl)sebacate and 0.2 part by weight of 2-(3-tert-butyl-5-methyl-2-hydroxy-phenyl)-5-chlorobenzotriazole as well as Carbon Black A or Carbon Black B of Example 1 or 3 in an amount shown in Table 2. After mixing the thus-proportioned mixtures separately in a Henschel mixer, they were separately pelletized by an extruder having a barrel diameter of 40 mm and maintained at 230° C. to obtain resin compositions of this Example 6 and 8 and they were added in amounts shown in Table 2. Results are shown in Table 2.

COMPARATIVE EXAMPLES 3–6

Tests were conducted in the same manner as in Examples 9, 11, 16 and 17 except that the amounts of the carbon black in these examples were changed to 1.0 part by weight. Results are shown in Table 2.

TABLE 2

| | Example | | | | | | | | | | | | | Comp. Ex. | | | |
|---|---|---|---|---|---|---|---|---|---|---|---|---|---|---|---|---|---|
| | 9 | 10 | 11 | 12 | 13 | 14 | 15 | 16 | 17 | 18 | 19 | 20 | 21 | 3 | 4 | 5 | 6 |
| Composition (wt. parts)* | | | | | | | | | | | | | | | | | |
| PP-B | 85 | 85 | 85 | 85 | 70 | 85 | 85 | — | — | 95 | 85 | 85 | 85 | 85 | 85 | — | — |
| PP-C | — | — | — | — | — | — | — | 85 | 70 | — | — | — | — | — | — | 85 | 70 |
| EPR-B | — | — | — | — | — | — | — | — | 15 | — | — | — | — | — | — | — | 15 |
| Talc 1.3 μm | 15 | 15 | 15 | 15 | 30 | — | — | 15 | 15 | 5 | 15 | 15 | 15 | 15 | 15 | 15 | 15 |
| $CaCO_3$ 1.9 μm | — | — | — | — | — | 15 | — | — | — | — | — | — | — | — | — | — | — |
| $BaSO_4$ 1.2 μm | — | — | — | — | — | — | 15 | — | — | — | — | — | — | — | — | — | — |
| Carbon Black A | 0.3 | 0.5 | — | 0.2 | 0.3 | 0.3 | 0.3 | 0.3 | 0.3 | 0.3 | — | — | — | 1.0 | — | 1.0 | 1.0 |
| Carbon Black B | — | — | 0.3 | 0.1 | — | — | — | — | — | — | — | — | — | — | 1.0 | — | — |
| Carbon Black C | — | — | — | — | — | — | — | — | — | — | 0.05 | 0.3 | — | — | — | — | — |
| Carbon Black D | — | — | — | — | — | — | — | — | — | — | — | — | 0.5 | — | — | — | — |
| Paintability | | | | | | | | | | | | | | | | | |
| Peeling strength of paint film (kg/cm) | 1.0 | 0.9 | 0.9 | 1.0 | 1.1 | 1.0 | 1.0 | 0.9 | 1.2 | 0.9 | 1.0 | 1.0 | 0.9 | 0.3 | 0.2 | 0.2 | 0.3 |
| Warm water resistance | O | O | O | O | O | O | O | O | O | O | O | O | O | X | X | X | X-Δ |

*Other additives - See Table 1.

invention in their pelletized forms. The thus-obtained resin compositions were separately molded by injection molding, thereby obtaining test pieces (80×160×2 mm plates) for their painting tests.

After subjecting each of these test pieces to a plasma treatment under the same conditions as those employed in Example 1, their paintability were evaluated. Results are shown in Table 2.

EXAMPLES 14–15

Tests were conducted in the same manner as in Example 9 except that the talc was changed to calcium carbonate having an average particle size of 1.9 μm and barium sulfate having an average particle size of 1.2 μm respectively. Results are shown in Table 2.

EXAMPLE 16

A test was conducted in the same manner as in Example 9 except that a propylene homopolymer (PP-C) having a melt flow index of 7.5 g/10 min was used in place of PP-B. Results are shown in Table 2.

EXAMPLE 17

A test was conducted in the same manner as in Example 16 except that the amounts of PP-C and talc were respectively changed to 70 parts by weight and 15 parts by weight and an ethylene-propylene rubber (EPR-B) having a propylene content of 27 wt. % and a Mooney viscosity of 70 at 100° C. was added in an amount of 15 parts by weight. Results are shown in Table 2.

EXAMPLE 18

A test was conducted in the same manner as in Example 9 except that the amounts of PP-B and talc were respectively changed to 95 parts by weight and 5 parts by weight. Results are shown in Table 2.

EXAMPLES 19–21

Tests were conducted in the same manner as in Example 9 except that the carbon black was respectively changed to Carbon Black C and Carbon Black D of

EXAMPLES 22–26

To 100 parts by weight of a propylene homopolymer (PP-D) the melt flow index of which was 4.0 g/10 min, were added 0.05 part by weight of 2,6-di-tert-butyl-4-methylphenol, 0.1 part by weight of calcium stearate, 0.2 part by weight of tetrakis-[methylene-3-(3',5'-di-tert-butyl-4'-hydroxyphenyl)propionate]methane, 0.4 part by weight of bis(2,2,6,6-tetramethyl-4-piperidyl)sebacate and 0.2 part by weight of 2-(3-tert-butyl-5-methyl-2-hydroxyphenyl)-5-chlorobenzotriazole as well as furnace black having an average particle size of 24 mμ and a specific surface area of 180 m²/g (Carbon Black E) or channel black having an average particle size of 18 mμ and a specific surface area of 210 m²/g (Carbon Black F) in an amount shown in Table 3. After mixing the thus-proportioned mixtures separately in a Henschel mixer, they were separately pelletized by an extruder having a barrel diameter of 40 mm and maintained at 230° C. The thus-obtained resin compositions were separately injection-molded into test pieces (80×160×2 mm plates).

After subjecting each of these test pieces to a plasma treatment in the same manner as in Example 1, their paintability were evaluated. Results are shown in Table 3.

EXAMPLE 27

A test was conducted in the same manner as in Example 22 except that an ethylene-propylene block copolymer (PP-E) having an ethylene content of 8 % by weight and a melt flow index of 3.8 g/10 min was used in place of PP-D and Carbon Black E was added in an amount shown in Table 3. Results are shown in Table 3.

EXAMPLES 28 & 29

Tests were conducted in the same manner as in Example 27 except that the same EPR-A as that employed in Example 5 were respectively added in amounts of 20 parts by weight and 40 parts by weight to 100 parts by weight of PP-E. Results are shown in Table 3.

EXAMPLES 30 & 31

Tests were conducted in the same manner as in Example 27 except that talc having an average particle size of 3.2 μm was respectively added in amounts of 10 parts by weight and 20 parts by weight to 100 parts by weight of PP-E. Results are shown in Table 3.

EXAMPLE 32

A test was conducted in the same manner as in Example 27 except that 20 parts by weight of calcium carbonate having an average particle size of 2.5 μm were added to 100 parts by weight of PP-E. Results are shown in Table 3.

EXAMPLES 33–35

Tests were conducted in the same manner as in Example 27 except that PP-E, EPR-A, talc and calcium carbonate were used in amounts shown in Table 3. Results are shown in Table 3.

COMPARATIVE EXAMPLES b 7–11

Tests were conducted in the same manner as in Examples 22, 25, 27, 28 and 33 except that the amounts of Carbon Black E or F were changed as shown in Table 3 based on 100 parts by weight of their respective polypropylene-base resins. Results are shown in Table 3.

size of 1.1 μm, were added 0.05 part by weight of 2,6-di-tert-butyl-4-methylphenol, 0.1 part by weight of calcium stearate, 0.2 part by weight of tetrakis-[methylene-3-(3',5'-di-tert-butyl-4'-hydroxyphenyl)propionate]methane, 0.4 part by weight of bis(2,2,6,6-tetramethyl-4-piperidyl)sebacate and 0.2 part by weight of 2-(3-tert-butyl-5-methyl-2-hydroxyphenyl)-5-chlorobenzotriazole as well as furnace black having an average particle size of 22 mμ and a specific surface area of 200 $m^2/g$ (Carbon Black G) or channel black having an average particle size of 16 mμ and a specific surface area of 220 $m^2/g$ (Carbon Black H) in an amount shown in Table 4. After mixing the thus-proportioned mixtures separately in a Henschel mixer, they were separately pelletized by an extruder having a barrel diameter of 40 mm and maintained at 230° C. The thus-obtained resin compositions were separately injection-molded to obtain test pieces (80×160×2 mm plates).

After subjecting each of these test pieces to a plasma treatment in the same manner as in Example 1, their paintability were evaluated. Results are shown in Table 4.

EXAMPLE 39

A test was conducted in the same manner as in Example 36 except that calcium carbonate having an average particle size of 1.9 μm was used in place of the talc.

TABLE 3

|  |  | Example | | | | | | | | | |
|---|---|---|---|---|---|---|---|---|---|---|---|
|  | Unit | 22 | 23 | 24 | 25 | 26 | 27 | 28 | 29 | 30 | 31 |
| Composition* | | | | | | | | | | | |
| (A) PP-D | wt. parts | 100 | 100 | 100 | 100 | 100 | — | — | — | — | — |
| PP-E | | — | — | — | — | — | 100 | 100 | 100 | 100 | 100 |
| (B) EPR-A | | — | — | — | — | — | — | 20 | 40 | — | — |
| (C) Talc 3.2 μm | | — | — | — | — | — | — | — | — | 10 | 20 |
| CaCO₃ 2.5 μm | | — | — | — | — | — | — | — | — | — | — |
| Carbon Black E | *** | 0.2 | 0.35 | 0.5 | — | 0.2 | 0.35 | 0.35 | 0.35 | 0.35 | 0.35 |
| Carbon Black F ** | | — | — | — | 0.35 | 0.15 | — | — | — | — | — |
| Peeling strength of paint film | kg/cm | 0.8 | 0.8 | 0.7 | 0.8 | 0.9 | 0.9 | 1.1 | 1.2 | 1.0 | 1.0 |
| Warm water resistance | — | O | O | O | O | O | O | O | O | O | O |

|  |  | Example | | | | Comparative Example | | | | |
|---|---|---|---|---|---|---|---|---|---|---|
|  | Unit | 32 | 33 | 34 | 35 | 7 | 8 | 9 | 10 | 11 |
| Composition* | | | | | | | | | | |
| (A) PP-D | wt. parts | — | — | — | — | 100 | 100 | — | — | — |
| PP-E | | 100 | 100 | 100 | 100 | — | — | 100 | 100 | 100 |
| (B) EPR-A | | — | 20 | 40 | 40 | — | — | — | 20 | 20 |
| (C) Talc 3.2 μm | | — | 10 | 10 | — | — | — | — | — | 10 |
| CaCO₃ 2.5 μm | | 20 | — | — | 10 | — | — | — | — | — |
| Carbon Black E | *** | 0.35 | 0.35 | 0.35 | 0.35 | 1.0 | — | 1.0 | 0.85 | 0.7 |
| Carbon Black F ** | | — | — | — | — | — | 1.0 | — | — | — |
| Peeling strength of paint film | kg/cm | 1.0 | 1.2 | 1.3 | 1.3 | 0.2 | 0.1 | 0.2 | 0.3 | 0.4 |
| Warm water resistance | — | O | O | O | O | X | X | X | Δ-X | Δ-X |

*Other additives - See Table 1.
**Evaluation results of paintability.
***Parts by weight based on 100 parts by weight of the sum of (A), (B) and (C).

EXAMPLES 36–38

To 100 parts by weight in total of 75 parts by weight of a crystalline ethylene-propylene block copolymer containing 12.5 wt. % of ethylene and 94.2 wt. % of matter insoluble in boiling n-heptane and having a melt flow index of 13.5 g/10 min (hereinafter called "PP-F"), 20 parts by weight of an ethylene-propylene rubber having a propylene content of 59 wt. % and a Mooney viscosity of 27 at 100° C. (hereinafter called "EPR-C") and 5 parts by weight of talc having an average particle Results are shown in Table 4.

EXAMPLE 40

A test was conducted in the same manner as in Example 36 except that the same EPR-A as that employed in Example 5 was used in place of EPR-C. Results are shown in Table 4.

EXAMPLE 41

A test was conducted in the same manner as in Example 36 except that ethylene-propylene-diene rubber (hereinafter called "EPDM") having a propylene content of 27 wt. % and a Mooney viscosity of 88 at 100° C. and containing ethylidenenorbornane as a third component was used in place of EPR-C in an amount shown in Table 4. Results are shown in Table 4.

EXAMPLES 42 & 43

Tests were conducted in the same manner as in Example 36 except that PP-F, EPR-C and talc were used in amounts shown in Table 4. Results are shown in Table 4.

EXAMPLE 44

A test was conducted in the same manner as in Example 36 except that a crystalline ethylene-propylene block copolymer containing 14 wt. % of ethylene and 85 wt. % of matter insoluble in boiling n-heptane and having a melt flow index of 3.5 g/10 min (PP-G) was used in place of EPR-C in an amount shown in Table 4. Results are shown in Table 4.

COMPARATIVE EXAMPLES 12-16

Tests were conducted in the same manner as in Examples 36, 37 and 39 - 41 except that Carbon Black A or B was added in amounts shown in Table 5. Results are shown in Table 5.

COMPARATIVE EXAMPLES 17-19

(Comparative Tests as Bumpers)

PP-F, EPR-C and talc were mixed in amounts shown in Table 6. The resultant mixtures were separately pelletized in the same manner as in Example 36. The thus-obtained pellet samples were separately molded by an injection-molding machine into prescribed test pieces. Physical properties of the test pieces were then measured. Since the balance of their physical properties, i.e., stiffness and impact resistance as resin compositions for bumpers were inferior compared with the test piece obtained in Example 36, their paintability were not evaluated.

Measurement results of their physical properties are shown in Table 6, in comparison with the corrsponding data of the test piece obtained in Example 36.

In Table 6, each melt flow indexes (MI), modulus of elasticity in flexure and Izod impact strength were measured in accordance with ASTM D-1238, ASTM D-790 and ASTM D-256, respectively.

TABLE 4

| | Unit | Example 36 | 37 | 38 | 39 | 40 | 41 | 42 | 43 | 44 |
|---|---|---|---|---|---|---|---|---|---|---|
| Composition* | | | | | | | | | | |
| PP-F | wt. parts | 75 | 75 | 75 | 75 | 75 | 85 | 60 | 70 | — |
| PP-G | | — | — | — | — | — | — | — | — | 60 |
| EPR-C | | 20 | 20 | 20 | 20 | — | — | 25 | 20 | 35 |
| EPR-A | | — | — | — | — | 20 | — | — | — | — |
| EPDM | | — | — | — | — | — | 10 | — | — | — |
| Talc 1.1 μm | | 5 | 5 | 5 | — | 5 | 5 | 15 | 10 | 5 |
| CaCO3 1.9 μm | | — | — | — | 5 | — | — | — | — | — |
| Carbon Black G | | 0.3 | — | 0.2 | 0.3 | 0.3 | 0.3 | 0.05 | 0.5 | 0.6 |
| Carbon Black H | | — | 0.3 | 0.1 | — | — | — | — | — | — |
| Paintability | | | | | | | | | | |
| Peeling strength of paint film | kg/cm | 1.2 | 1.1 | 1.2 | 1.2 | 1.1 | 0.9 | 1.3 | 1.0 | 1.0 |
| Warm water resistance | — | O | O | O | O | O | O | O | O | O |

*Other additives - See Table 1.

TABLE 5

| | Unit | Comparative Example 12 | 13 | 14 | 15 | 16 |
|---|---|---|---|---|---|---|
| Composition* | | | | | | |
| PP-F | wt. parts | 75 | 75 | 75 | 75 | 85 |
| PP-G | | — | — | — | — | — |
| EPR-C | | 20 | 20 | 20 | — | — |
| EPR-A | | — | — | — | 20 | — |
| EPDM-A | | — | — | — | — | 10 |
| Talc (1.1 μm) | | 5 | 5 | — | 5 | 5 |
| CaCO3 (1.9 μm) | | — | — | 5 | — | — |
| Carbon Black G | | 0.7 | — | 0.8 | 1.0 | 1.0 |
| Carbon Black H | | — | 1.0 | — | — | — |
| Paintability | | | | | | |
| Peeling strength of paint film (kg/cm) | | 0.4 | 0.2 | 0.3 | 0.2 | 0.3 |
| Warm water resistance | | Δ-X | Δ-X | Δ-X | Δ-X | Δ-X |

*Other additives: See Table 1.

TABLE 6

| | Unit | Ex. 36 | Comp. Ex. 17 | Comp. Ex. 18 | Comp. Ex. 19 |
|---|---|---|---|---|---|
| Composition | | | | | |
| PP-F | wt. parts | 75 | 90 | 55 | 60 |
| EPR-C | | 20 | 5 | 40 | 20 |
| Talc (1.1 μm) | | 5 | 5 | 5 | 20 |
| Carbon black G | | 0.3 | 0.3 | 0.3 | 0.3 |
| Physical property | | | | | |
| M.I. | (g/10 min) | 8.5 | 9.5 | 5.8 | 7.2 |
| Modulus of elasticity in flexure | (kg/cm$^2$) | 11500 | 12800 | 4800 | 16800 |
| Izod impact strength (−40° C.; notched) | (kg · cm/cm) | 35.4 | 5.1 | unbroken | 6.8 |

What is claimed is:

1. A polypropylene resin composition suitable for use in the production of molded articles having excellent paintability, comprising:
   (a) 100 parts by weight of a crystalline ethylene-propylene block copolymer;
   (b) 7 to 60 parts by weight of a thermoplastic elastomer;
   (c) 3 to 30 parts by weight of an inorganic filler; and
   (d) 0.01 to 0.6 weight percent, based on the total weight of the copolymer (a), elastomer (b) and filler (c), of carbon black.

2. A resin composition as claimed in claim 1, wherein the carbon black has an average particle size of 5–40 mμ and a specific surface area of 50–1,100 m²/g.

3. A resin composition as claimed in claim 1, wherein the propylene-base resin is a propylene homopolymer or a copolymer of propylene and one or more other α-olefins.

4. A resin composition as claimed in claim 1, wherein the ethylene-propylene block copolymer contains 7–30 wt. % of ethylene and at least 65 wt. % of matter insoluble in boiling n-heptane.

5. A resin composition as claimed in claim 1, wherein the thermoplastic elastomer is an ethylene-propylene rubber, ethylene-propylene-diene rubber, styrene-butadiene rubber or isobutylene-isoprene rubber.

6. A resin composition as claimed in claim 1, wherein the thermoplastic elastomer is an ethylene-propylene rubber or ethylene-propylene-diene rubber having a propylene content of 20–90 wt. % and a Mooney viscosity of 15–100 at 100° C.

7. A resin composition as claimed in claim 1, wherein the inorganic filler is calcium oxide, magnesium oxide, calcium hydroxide, magnesium hydroxide, aluminum hydroxide, magnesium carbonate, calcium silicate, magnesium silicate, calcium sulfate, magnesium sulfate, calcium carbonate, barium sulfate, calcium sulfite, potassium titanate, talc, clay, mica, glass powder, basic magnesium carbonate, dolomite or wollastonite, which has an average particle size of 6 μm or smaller and contains 5 wt. % or less of particles having particle sizes of 10 μm or greater.

8. A resin composition as claimed in claim 7, wherein the inorganic filler is calcium carbonate, barium sulfate or talc.

9. A polypropylene resin composition suitable for use in the production of bumpers having excellent paintability, comprising:
   (a) 100 parts by weight of a crystalline ethylene-propylene block copolymer;
   (b) 7–60 parts by weight of a thermoplastic elastomer;
   (c) 3–30 parts by weight of an inorganic filler; and
   (d) 0.01–0.6 wt. %, based on the sum of the copolymer (a), elastomer (b) and filler (c), of carbon black.

10. A resin composition as claimed in claim 9, wherein the ethylene-propylene block copolymer contains 7–30 wt. % of ethylene and at least 65 wt. % of matter insoluble in boiling n-heptane.

11. A resin composition as claimed in claim 9, wherein the thermoplastic elastomer is an ethylene-propylene rubber or ethylene-propylene-diene rubber having a propylene content of 20–90 wt. % and a Mooney viscosity of 15–100 at 100° C.

12. A resin composition as claimed in claim 9, wherein the inorganic filler is calcium oxide, magnesium oxide, calcium hydroxide, magnesium hydroxide, aluminum hydroxide, magnesium carbonate, calcium silicate, magnesium silicate, calcium sulfate, magnesium sulfate, calcium carbonate, barium sulfate, calcium sulfite, potassium titanate, talc, clay, mica, glass powder, basic magnesium carbonate, dolomite or wollastonite, which has an average particle size of 6 μm or smaller and contains 5 wt. % or less of particles having particle sizes of 10 μm or greater.

13. A resin composition as claimed in claim 9, wherein the carbon black has an average particle size of 5–40 mμ and a specific surface area of 50–1,100 m²/g.

14. A polypropylene resin bumper having excellent paintability, characterized in that said bumper has been molded from the resin composition claimed in claim 9 and then subjected to a plasma treatment at the surface thereof.

15. A molded polypropylene resin article having excellent paintability, characterized in that said article has been molded from the resin composition claimed in claim 1 and then subjected to a plasma treatment on the surface thereof.

* * * * *